Feb. 15, 1944.   G. W. REHFELD   2,341,515
JETTY STRUCTURE FOR CONTROLLING RIVER AND SURFACE WATER
Filed Feb. 3, 1941   3 Sheets-Sheet 3
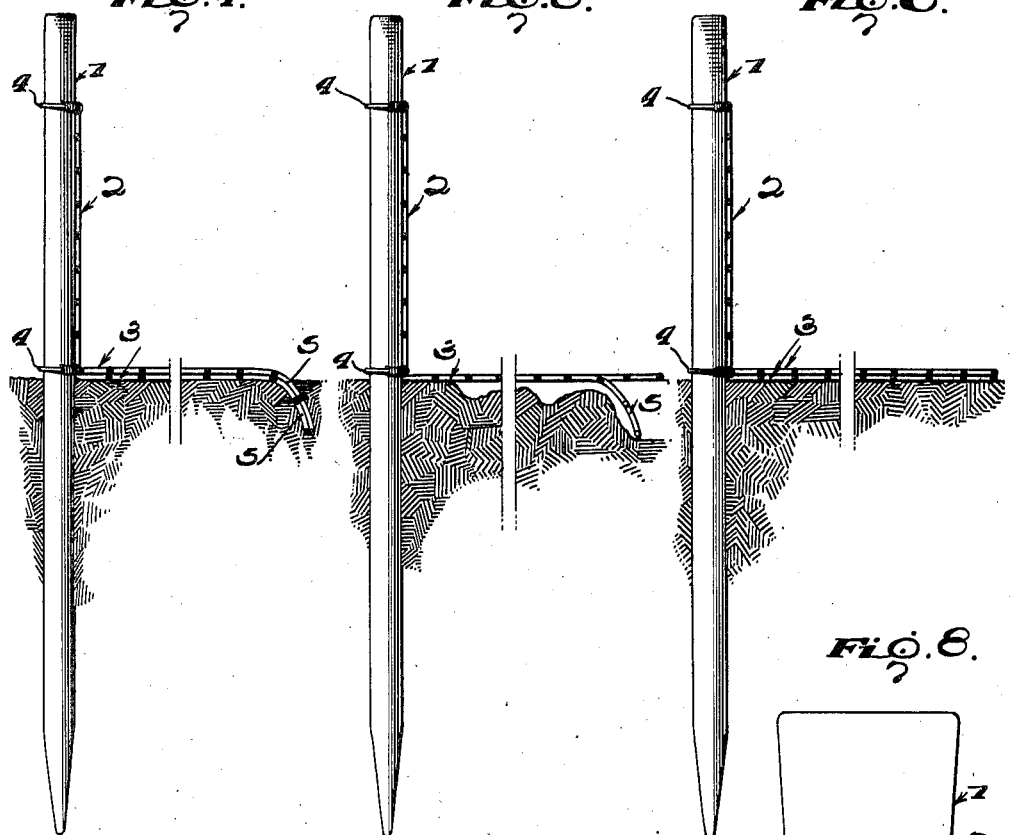
Inventor
George W. Rehfeld
By Arthur C. Brown
Attorney Patented Feb. 15, 1944

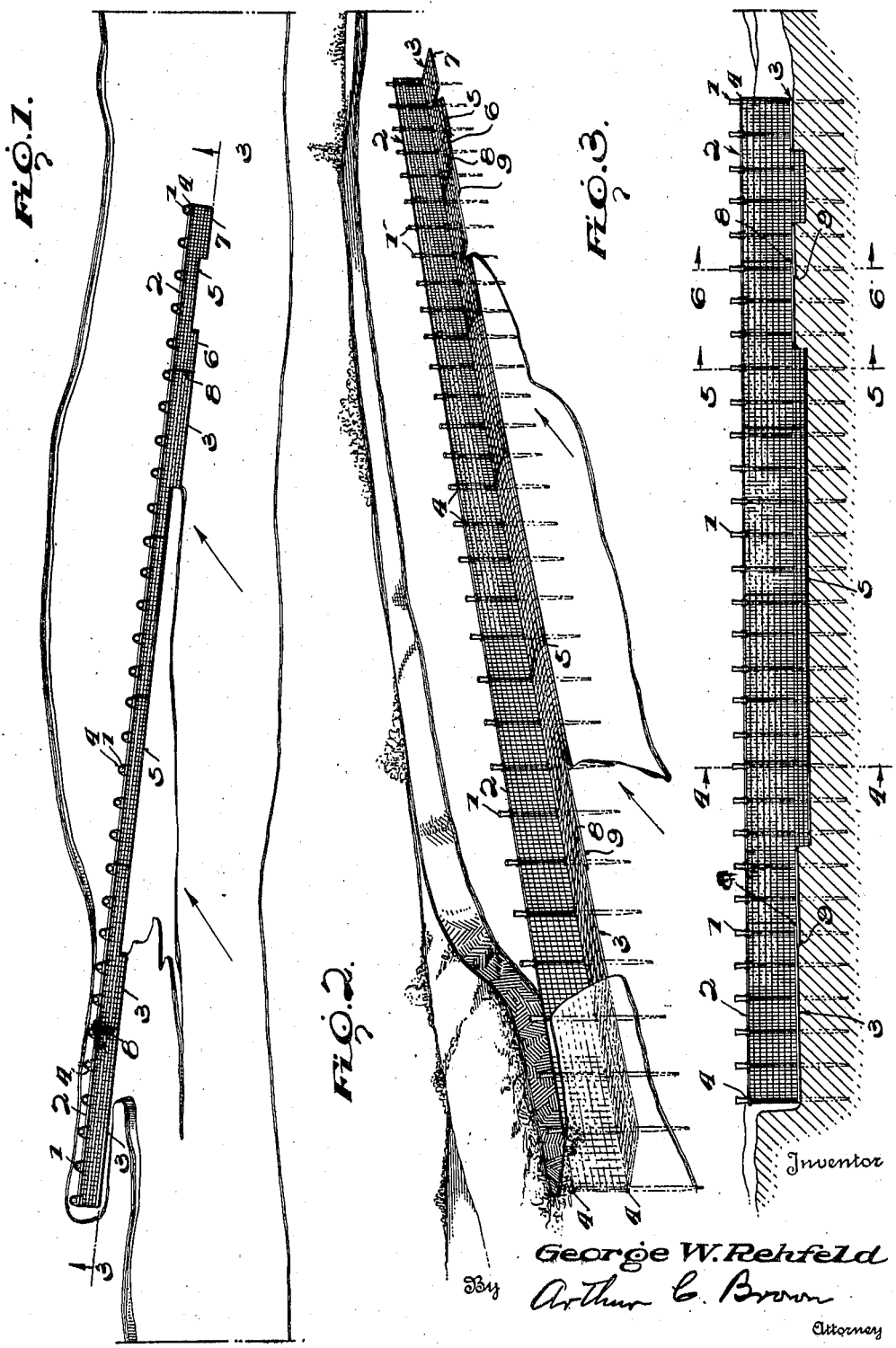

2,341,515

UNITED STATES PATENT OFFICE 2,341,515

JETTY STRUCTURE FOR CONTROLLING RIVER AND SURFACE WATER

George W. Rehfeld, Manhattan, Kans.

Application February 3, 1941, Serial No. 377,263

3 Claims. (Cl. 61—3)

The invention relates to a jetty structure for controlling river and surface water.

The object of the present invention is to provide a simple, strong, durable and inexpensive jetty structure designed for controlling river and surface water and adapted to be arranged in wing formation at intervals at angles of various degrees suitable for protecting river banks against erosion and surface water wash and also for protecting bridges against inundation and underscour and at the same time reclaim lost land by causing deposit of silt back of the jetty structure.

A further object of the invention is to arrange a plurality of jetty structures having vertical and horizontal elements or members of woven material with the horizontal or substantially horizontal elements or members arranged upon and supported by the bottom of a river, stream or other surface and adapted to conform automatically substantially to the configuration of the supporting surface and thereby prevent water from scouring out the bottom surface under such horizontal elements or members and destroying or injuriously affecting the stability of the upright portions of the jetty structures with which such horizontal bottom elements or members are connected.

Another object of the invention is to arrange a plurality of jetty structures of various lengths in approximately longitudinal alignment having horizontal elements or members of woven material arranged upon the bottom of a river, stream, or upon other supporting surfaces in overlapping relation so as to be extensible in a direction longitudinally of the jetty structures to permit such members or elements to conform automatically to the configuration of the supporting surface, and thereby prevent water from scouring out the bottom surface and injuriously affecting the jetty structure.

Another object of the invention is to provide a jetty structure of this character provided with a substantially horizontal element or member of woven material having its outer longitudinal marginal portion or a section thereof curved downwardly and embedded in the bottom surface to prevent water from undermining the jetty structure and carrying driftwood or other debris under the horizontal element or member and floating the same upward or otherwise dislodging or dislodging the woven horizontal element from the supporting surface upon which said horizontal element or member is placed.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction within the scope of the claims, may be resorted to without departing from the spirit or sacrificing any advantages of the invention.

In the drawings:

Figure 1 is a plan view of a plurality of jetties constructed in accordance with this invention and arranged in wing formation in a river.

Figure 2 is a perspective view of the same.

Figure 3 is a longitudinal sectional view on the line 3—3 of Figure 1.

Figure 4 is a transverse sectional view of the jetty structure on the line 4—4 of Figure 3.

Figure 5 is a similar view on the line 5—5 of Figure 3.

Figure 6 is a transverse sectional view of the jetty structure taken on the line 6—6 of Figure 3.

Figure 7 is an enlarged plan view of a portion of the adjacent ends of two jetty structures particularly illustrating the overlap of the vertical and horizontal members.

Figure 8 is a detail view illustrating one fastening means for securing the metal mesh member to one of the posts or piles.

Figure 9 is an enlarged perspective view of a portion of the jetty structure.

Figure 10:
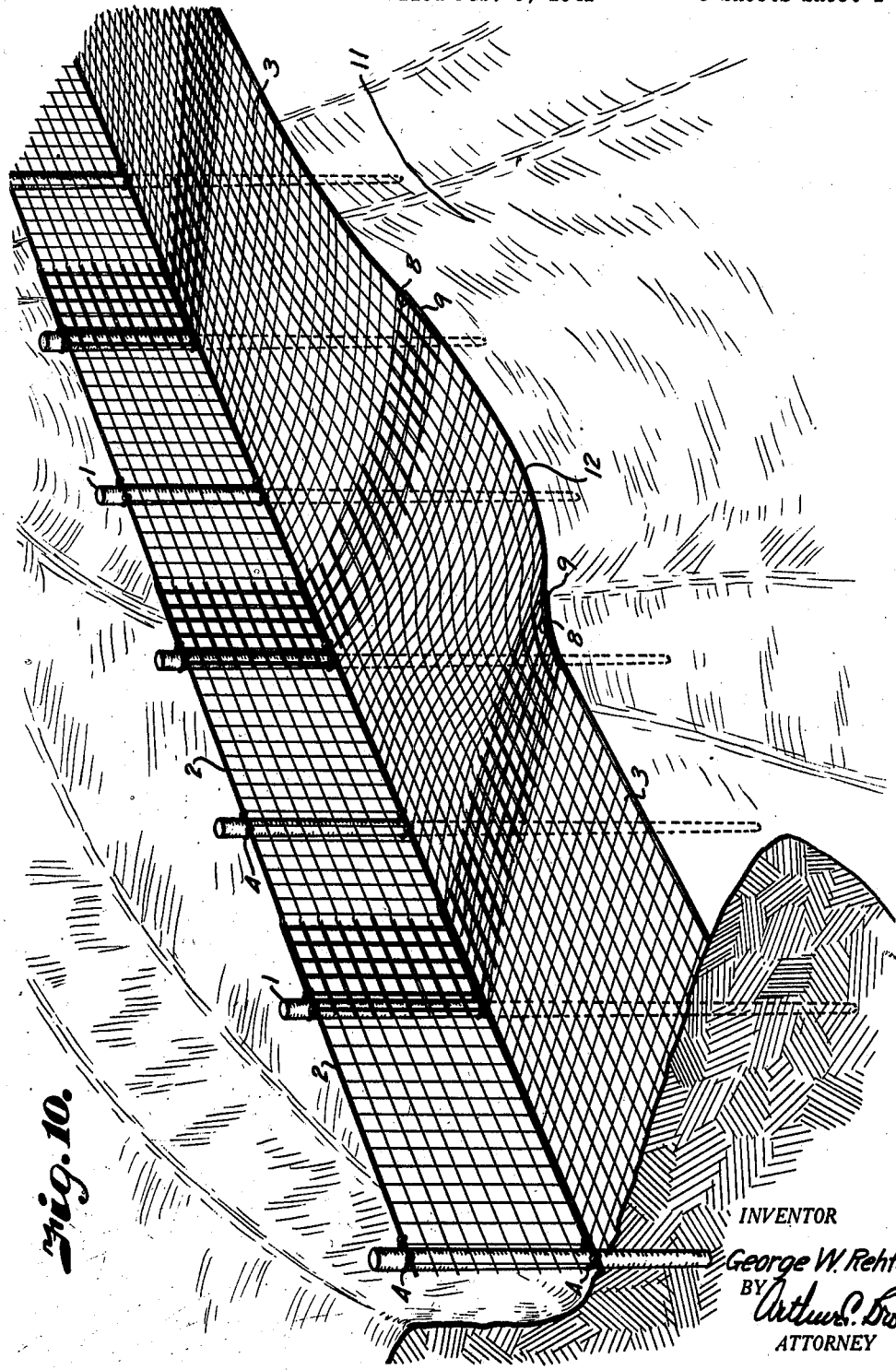
Figure 10 is a perspective view of a portion of the jetty structure, particularly illustrating the horizontal member sagging into a scoured channel and the variation of the overlap of said horizontal members due to said sagging.

In the accompanying drawings in which is illustrated one embodiment and arrangement of the jetty structure, the jetty structure comprises in its construction a row of piling 1 and vertical and substantially horizontal elements or members 2 and 3 constructed of woven material such as woven wire, woven rods or the like. The piling or upright posts or members 1 which may be driven into the earth in any suitable manner may be constructed of any suitable material such as wood, concrete, metal or a combination of metal and concrete. The piling may be of any desired size according to the requirements of the purpose or purposes for which the jetty structure is designed and may be spaced apart any suitable distance.

The jetty structure may be of any desired length and the woven wire members may be of any length and width and may be formed of a single piece of woven material extending downwardly from the upper edge of the vertical member to the bottom thereof and outwardly therefrom to the outer edge of the horizontal member but separate pieces or sections may of course be employed in the construction of said members. The woven material may be of any suitable formation and the metal wires or rods composing the woven material may be electrically spot welded or connected in any other suitable manner. Also the interstitial openings formed by the crossed or woven wires or rods may be of any desired formation.

The vertical member 2 is conveniently secured to the upright posts or piling by wire ties 4 but any other suitable means may be employed for fastening the woven material to the posts or piles. While the wire ties are shown arranged at the top and bottom of the vertical woven member they may be arranged at any desired points and any suitable number may be employed. The vertical woven member 2 is substantially oblong and the horizontal woven member 3 which is also oblong is designed to be arranged upon the bed of a river, stream or the like and the weight of the bottom member 3 and the character of its connection to the vertical woven member are such that the outer portion of the bottom member will flex to adjust itself automatically to the configuration of the river bed, but not of such weight that it will sink into the bed or drag the remainder of the jetty down into the scoured places.

In order to prevent more effectually water from scouring beneath the bottom member 3 and enable the bottom member to take care of the depressions and low places in the river bed the bottom member may be provided throughout the whole or a portion of its length with a downwardly curved marginal portion 5 which is embedded in the material of the river bed and which is adapted to prevent the water from scouring beneath the bottom member and carrying driftwood, logs and the like beneath the same which might float the bottom member upwardly from the river bed displacing the bottom member from its proper position on the river bed. By having the bottom member conform substantially to the bottom of the river bed the posts or piles constituting the upright members 1 are protected from scouring and swirling water and which might destroy or injuriously affect the stability of the posts or piles and cause deterioration of the jetty structure. The bottom member continues to flex and to retard scouring action of the stream as long as any of the piles are standing.

As illustrated in the drawings, the downwardly curved marginal portion or flange 5 is located intermediate of the ends of the bottom member and is formed by partially severing the woven material at spaced points by short transverse cuts and then bending or curving the partially severed marginal portion downwardly as shown but the downwardly curved marginal portion 5 may be formed in any other desired manner and it may be of any desired length and be located at either or both ends of the bottom member instead of between the straight substantially flattened portions 6 and 7 as shown in the drawings.

The jetty structure which may be advantageously employed in wing formation is designed where required to be composed of a plurality of jetties arranged end-to-end and having the adjacent ends 8 and 9 of the horizontal members overlap to provide a slidable fit or connection between the adjacent ends of the horizontal members of the jetty structures and afford an adjustment which will render the jetty structures extensible in a longitudinal direction and facilitate the automatic adjustment of the horizontal members thereof in conforming automatically to the configuration of the river bed. Whether a wing jetty structure or a plurality of jetty structures are employed, the horizontal member or members will automatically maintain substantial contact with the supporting surface and afford continual protection for the piling or pile-like members.

The horizontal members which have through the character of the material a hinge connection between them and the vertical members are adapted through their weight to maintain a substantial portion of themselves firmly upon the bottom or bed of a river, stream or the like and the slidable relation between the adjacent ends of the horizontal members will provide a sufficient extension in a longitudinal direction to enable the horizontal members to hinge downwardly under ordinary conditions and the outer portion will flex to conform substantially fully to the configuration of a river bed.

The flexing of the horizontal member and the longitudinal movement or sliding action between the overlap at the outer ends of said members are particularly shown in Figure 10 where a portion of the horizontal member 3 sags downwardly to follow the contour of a scoured channel 11. The outer end of the horizontal member directly over the scoured channel sags into and lies on the surface at the bottom of said channel. The ends of the adjacent member also tend to follow the sagging action and all of the horizontal members extending over the scoured channel continue to maintain contact with the surface of the channel to protect the piling against further scouring. As illustrated in Figure 10, the sagging of the horizontal members effects a substantial increase in the total length of the outer end of said horizontal portion of the jetty and this lengthening effect is provided for by the overlap of said members to enable the jetty to continue to present a continuous protection to the piling and jetty, as the overlap prevents any openings or exposed places in the bed under said jetty.

The jetty structure or a plurality of jetty structures forming a wing may extend into a river, stream or the like from one side of the same at angles thereto of various degrees and any number of the jetty wings may be employed to suit requirements. The jetty structure may extend inland different distances and the jetty structure is also susceptible of being placed entirely inland where it is desired to protect land further in from the jetty structure from erosion. Where the river bank outwardly from and beyond the jetty structure is liable to be washed away in which event the jetty structure will be in position to prevent further approachment of the river or stream, under such conditions a ditch will of course be provided for installing the jetty structure and this may or may not be filled in after the jetty structure or structures are installed.

What is claimed is:

1. In combination, a plurality of jetty structures each including spaced upright pile members having portions penetrating the earth, and substantially vertical and horizontal flexible metal mesh members, the vertical metal mesh member being secured to said upright pile members and the horizontal metal mesh members extending outwardly from the vertical members of the jetty structures and having their adjacent ends arranged in overlapping relatively movable relation whereby the horizontal metal mesh members of the jetty structures are flexible in a longitudinal direction and conform substantially to the configuration of the supporting surface upon which they may be placed during and after scouring action on said surface.

2. In combination a plurality of jetty structures each including spaced upright pile members having portions penetrating the earth, substantially vertical and horizontal flexible metal mesh members, the vertical metal mesh member being secured to said upright pile members, and means securing the adjacent edges of the horizontal and vertical members together, said horizontal metal mesh members of the jetty structures having their adjacent ends arranged in overlapping relatively movable relation whereby the outer portions of the horizontal metal mesh members of the jetty structures are flexible in a longitudinal direction and conform substantially to the configuration of the supporting surface upon which they may be placed, during and after scouring action on said surface, said horizontal metal mesh members being provided at their outer marginal edges with downwardly extending anchoring flange portions embedded in the supporting surface.

3. In a river jetty structure, a line of spaecd piles having their lower portions penetrating the earth, a substantially vertical metal mesh member fittted against said piles and secured to the same, and a flexible metal mesh member extending from the lower portion of the substantially vertical mesh member outwardly from the line of piles and arranged upon the river bed and being of a width at least as great as the height of the vertical mesh member to cover a substantial area of the surface of said river bed and having sufficient flexibility to conform automatically to and maintain contact substantially throughout its entire area with said river bed surface in initial installation and throughout subsequent changes in configuration of said surface due to scouring action of water, thereby protecting the bed of the river a substantial distance beyond the line of piles and reducing the effect of said scouring action.

GEORGE W. REHFELD.